(12) United States Patent
Mitsuta et al.

(10) Patent No.: US 6,548,624 B2
(45) Date of Patent: Apr. 15, 2003

(54) POLYCARBONATE RESIN COMPOSITION

(75) Inventors: Naoki Mitsuta, Ichihara (JP); Akio Nodera, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 10/173,005

(22) Filed: Jun. 18, 2002

(65) Prior Publication Data

US 2002/0193476 A1 Dec. 19, 2002

Related U.S. Application Data

(62) Division of application No. 09/868,037, filed as application No. PCT/JP00/06996 on Oct. 6, 2000, now Pat. No. 6,476,178.

(30) Foreign Application Priority Data

Oct. 19, 1999  (JP) ............................................. 11-296470

(51) Int. Cl.⁷ ............................................... C08G 64/00
(52) U.S. Cl. ........................................ 528/196; 528/198
(58) Field of Search .................................. 528/196, 198

(56) References Cited

FOREIGN PATENT DOCUMENTS

| | | |
|---|---|---|
| EP | 1 43 906 | 8/1984 |
| EP | 6 43 096 | 8/1994 |
| JP | 47-22088 | 6/1972 |
| JP | 05-222283 | 8/1993 |
| JP | 05-257002 | 10/1993 |
| JP | 06-065416 | 3/1994 |
| JP | 6-111612 | 4/1994 |
| JP | 11-181267 | 7/1999 |

Primary Examiner—Terressa M. Boykin
(74) Attorney, Agent, or Firm—Oblon, Spivak, McClelland, Maier & Neustadt, P.C.

(57) ABSTRACT

The invention relates to a polycarbonate resin composition having good durability even in high-moisture atmospheres, and to a flame-retardant polycarbonate resin composition in which the flame retardants adheres little to molds while the resin composition is molded. The polycarbonate resin composition comprises (A) a polycarbonate resin and (B) an inorganic filler, and contains (C) an arylphosphine and optionally (D) a flame retardant.

9 Claims, No Drawings

POLYCARBONATE RESIN COMPOSITION

This application is a Division of Ser. No. 09/868,037 Oct. 23, 2001 now U.S. Pat. No. 6,476,178 which is a 371 of PCT/JP00/06996 filed Oct. 6, 2000.

TECHNICAL FIELD

The present invention relates to a polycarbonate resin composition. More precisely, the invention relates to a polycarbonate resin composition having good durability even in high-humidity atmosphere, and to a flame-retardant polycarbonate resin composition in which the flame retardant adheres little to molds.

BACKGROUND ART

As having the advantages of impact resistance, heat resistance and good electric properties, polycarbonate resins have many applications in various fields of, for example, OA (office automation) appliances, information and communication appliances, other electric and electronic appliances for industrial use and household use, automobile parts and building materials. Polycarbonate resins are self-extinguishable. However, some fields of typically OA appliances, information and communication appliances, and other electric and electronic appliances for industrial use and household use require higher flame retardancy, for which are used various flame retardants to improve their flame retardancy.

For improving the flame retardancy of polycarbonate resins, halogen-containing flame retardants such as bisphenol A halides and halogenated polycarbonate oligomers have been used along with a flame retardation promoter such as antimony oxide, as their flame-retarding ability is good. However, with the recent tendency toward safety living and environmental protection from discarded and incinerated wastes, the market requires flame retardation with non-halogen flame retardants. As non-halogen flame retardants, phosphorus-containing organic flame retardants, especially organic phosphate compounds may be added to polycarbonate resin compositions, for which various methods have been proposed. Such flame retardants, organic phosphate compounds serve also as a plasticizer, and polycarbonate resin compositions containing them exhibit excellent flame retardancy.

It is known to stabilize polycarbonate resins with organic phosphorus compounds added thereto, for example, as in Japanese Patent Publication No. 22088/1972 and Japanese Patent Laid-Open No. 90254/1985. However, in order to make polycarbonate resins resistant to flames by adding thereto a phosphate compound, a relatively large amount of the compound must be added to the resins. Polycarbonate resins require relatively high molding temperatures, and their melt viscosity is high. Therefore, for molding them into thin-walled and large-sized moldings, the molding temperature will have to be more and more higher. For these reasons, phosphate compounds often cause some problems when added to such polycarbonate resins, though their flame-retarding ability is good. For example, phosphate compounds often adhere to molds used for molding resins containing them, and, when the moldings containing them are left in high-temperature and high-humidity atmospheres, the compounds lower the impact strength of the moldings and yellow the moldings.

In Japanese Patent Laid-Open No. 283760/1990, proposed is a method of adding a hydroxyl group-having phosphorus compound such as phosphorous acid or phosphoric acid to a polycarbonate resin composition containing an inorganic filler, for stabilizing the filler in the composition. In this case, the phosphorus compound added to the resin composition is effective for stabilizing the inorganic filler in the composition. However, this is problematic in that, when the moldings of the resin composition are used in high-humidity atmospheres, their durability is lowered as the molecular weight of the polycarbonate resin therein is lowered, and, in addition, it is often difficult to recycle the moldings.

In Japanese Patent Laid-Open Nos. 228764/1995 and 239565/1996, proposed is a polycarbonate resin composition comprising a polycarbonate resin and a styrenic resin and containing a phosphate compound and talc.

When polycarbonate resins containing an inorganic filler such as talc are molded at high temperatures or when their moldings are recycled, the molecular weight of the resins is lowered to cause some problems in that the physical properties of the resin moldings are worsened and the moldings are much yellowed.

The present invention is to provide a polycarbonate resin composition having good durability even in high-humidity atmospheres and to provide a flame-retardant polycarbonate resin composition in which the flame retardant adheres little to molds.

DISCLOSURE OF THE INVENTION

We, the present inventors have assiduously studied in order to solve the problems in the prior art, and, as a result, have found that, when a suitable amount of an arylphosphine is added to a resin composition comprising a polycarbonate resin and an inorganic filler, then the above-mentioned object can be attained. On the basis of this finding, we have completed the present invention.

Specifically, the invention is summarized as follows:

[1] A polycarbonate resin composition comprising (A) from 50 to 99.9% by weight of a polycarbonate resin and (B) from 0.1 to 50% by weight of an inorganic filler, and containing (C) from 0.01 to 1 part by weight, relative to 100 parts by weight of the total of (A) and (B), of an arylphosphine of a general formula [1]:

$$P-(X)_3 \qquad [1]$$

wherein X represents a hydrocarbon group, and at least one X is an optionally-substituted aryl group having from 6 to 18 carbon atoms.

[2] The polycarbonate resin composition of above [1], wherein the inorganic filler (B) is talc or mica.

[3] The polycarbonate resin composition of above [1] or [2], wherein the inorganic filler (B) is talc having a mean particle size of from 0.2 to 20 $\mu$m.

[4] The polycarbonate resin composition of any of above [1] to [3], wherein the arylphosphine (C) is triphenylphosphine.

[5] The polycarbonate resin composition of any of above [1] to [4], which further contains (D) from 0.1 to 20 parts by weight, relative to 100 parts by weight of the total of the polycarbonate resin (A) and the inorganic filler (B), of a flame retardant.

[6] The polycarbonate resin composition of above [5], wherein the flame retardant (D) is one or more selected from the group of phosphates, red phosphorus and silicone compounds.

[7] The polycarbonate resin composition of above [5] or [6], which further contains (E) from 1 to 40 parts by weight, relative to 100 parts by weight of the total of the polycarbonate resin (A) and the inorganic filler (B), of a styrenic resin.

[8] The polycarbonate resin composition of above [7], wherein the styrenic resin (E) is a rubber-modified styrenic resin.

[9] The polycarbonate resin composition of any of above [5] to [8], which further contains (F) from 0.01 to 5 parts by weight, relative to 100 parts by weight of the total of the polycarbonate resin (A) and the inorganic filler (B), of a polyfluoro-olefin resin.

[10] The polycarbonate resin composition of above [9], wherein the polyfluoro-olefin resin (F) is a polytetrafluoroethylene having the ability to form fibrils and having a mean molecular weight of at least 500,000.

[11] Housings or parts of electric and electronic appliances, made by molding the polycarbonate resin composition of any of above [1] to [10].

BEST MODES OF CARRYING OUT THE INVENTION

The invention is described in detail hereinunder.

(A) Polycarbonate Resin:

The polycarbonate resin for the component (A) that constitutes the polycarbonate resin composition of the invention is not specifically defined in point of its chemical structure and production method, and various polycarbonate resins are usable herein. For example, preferred are aromatic polycarbonate resins that are produced through reaction of diphenols and carbonate precursors.

For these, various diphenols are usable. For example, preferred are 2,2-bis(4-hydroxyphenyl)propane, bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cyclohexane, bis(4-hydroxyphenyl) ether, bis(4-hydroxyphenyl) sulfide, bis(4-hydroxyphenyl) sulfone, bis(4-hydroxyphenyl) sulfoxide, bis(4-hydroxyphenyl) ketone, hydroquinone, resorcinol, and catechol. Of the diphenols, more preferred are bis(hydroxyphenyl)alkanes, in particular, 2,2-bis(4-hydroxyphenyl)propane. The diphenols may be used either singly or as combined.

The carbonate precursors for use in the invention include, for example, carbonyl halides, carbonyl esters, and haloformates, more concretely, phosgene, diphenol dihaloformates, diphenyl carbonate, dimethyl carbonate, and diethyl carbonate.

Regarding its chemical structure, the molecular chain of the polycarbonate resin may have a linear, cyclic or branched structure. For the branching agent for the polycarbonate resin having a branched structure, for example, preferred are 1,1,1-tris(4-hydroxyphenyl)ethane, α,α',α"-tris(4-hyroxyphenyl)-1,3,5-triisopropylbenzene, phloroglucine, trimellitic acid, and isatin-bis(o-cresol). The polycarbonate resin may be a polyester-polycarbonate resin produced from ester precursors, for example, difunctional carboxylic acids such as terephthalic acid or their ester-forming derivatives. Various types of different polycarbonate resins may be mixed to give mixed polycarbonate resins for use in the invention.

The viscosity-average molecular weight of the polycarbonate resin may fall generally between 10,000 and 50,000, but preferably between 13,000 and 35,000, more preferably between 15,000 and 20,000. The viscosity-average molecular weight (Mv) is obtained as follows: The viscosity of the polycarbonate resin in a methylene chloride solution at 20° C. is measured with an Ubbelohde's viscometer, and the limiting viscosity $[\eta]$ thereof is derived from it. The viscosity-average molecular weight (Mv) of the resin is calculated according to the equation, $[\eta]=1.23\times10^{-5} Mv^{0.83}$. For controlling the molecular weight of the polycarbonate resin, for example, employable are phenol, p-t-butylphenol, p-t-octylphenol, and p-cumylphenol.

The polycarbonate resin may also be a polycarbonate-polyorganosiloxane copolymer. The copolymer can be produced, for example, by dissolving a polycarbonate oligomer and a polyorganosiloxane having a terminal reactive group in a solvent such as methylene chloride, adding thereto an aqueous solution of a diphenol in sodium hydroxide, and reacting them in a mode of interfacial polycondensation in the presence of a catalyst such as triethylamine. The polyorganosiloxane structure in the copolymer is preferably any of a polydimethylsiloxane structure, a polydiethylenesiloxane structure, a polymethylphenylsiloxane structure or a polydiphenylsiloxane structure.

Also preferably, the degree of polymerization of the polycarbonate moiety of the polycarbonate-polyorganosiloxane copolymer falls between 3 and 100 or so, and that of the polyorganosiloxane moiety thereof falls between 2 and 500 or so. Also preferably, the polyorganosiloxane moiety content of the polycarbonate-polyorganosiloxane copolymer falls between 0.5 and 30% by weight, more preferably between 1 and 20% by weight. Also preferably, the viscosity-average molecular weight of the polycarbonate-polyorganosiloxane copolymer falls between 5,000 and 100,000, more preferably between 10,000 and 30,000.

(B) Inorganic Filler:

The inorganic filler for the component (B) includes, for example, talc, mica, kaolin, diatomaceous earth, calcium carbonate, calcium sulfate, barium sulfate, glass fibers, carbon fibers, and potassium titanate. Of those, preferred are tabular talc and mica. Talc is a hydrous silicate of magnesium, and any commercially-available products of it are employable herein. Talc for use herein may have a mean particle size of from 0.1 to 50 μm, but preferably from 0.2 to 20 μm.

(C) Arylphosphines:

Arylphosphines for the component (C) are represented by the above-mentioned formula [1]. In formula [1], X indicates a hydrocarbon group, and at least one X is an optionally-substituted aryl group having from 6 to 18 carbon atoms.

The arylphosphines of the type include, for example, triphenylphosphine, diphenylbutylphosphine, diphenyloctadecylphosphine, tris(p-tolyl)phosphine, tris(p-nonylphenyl)phosphine, tris(naphthyl)phosphine, diphenyl(hydroxymethyl)phosphine, diphenyl(acetoxymethyl)phosphine, diphenyl(β-ethylcarboxyethyl)phosphine, tris(p-chlorophenyl)phosphine, tris(p-fluorophenyl)phosphine, diphenylbenzylphosphine, diphenyl-β-cyanoethylphoshpine, diphenyl(p-hydroxyphenyl)phosphine, diphenyl-1,4-dihydroxyphenyl-2-phosphine, and phenylnaphthylbenzylphosphine. One or more of these arylphosphines may be used herein either singly or as combined. Of the arylphosphines, especially preferred is triphenylphosphine.

(D) Flame Retardant:

The flame retardant for the component (D) includes, for example, organic phosphorus compounds, non-halogen phosphorus compounds and silicone compounds.

The organic phosphorus compounds are preferably phosphate compounds, for example, those of the following general formula, and their oligomers and polymers.

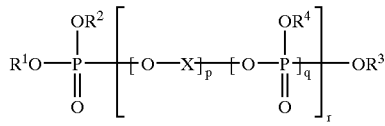

wherein $R^1$, $R^2$, $R^3$ and $R^4$ each independently represent a hydrogen atom, or a substituted or unsubstituted alkyl, cycloalkyl, aryl, alkoxy, aryloxy, arylthio, arylalkoxyalkyl or arylsulfonylaryl group; X represents a substituted or unsubstituted alkylene, phenylene, biphenylene or naphthalene group; p is 0 or 1; q is an integer of 1 or larger; and r is 0 or an integer of 1 or larger.

Specific examples of the phosphate compounds of the formula are trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, diisopropylphenyl phosphate, trixylenyl phosphate, tris(isopropylphenyl) phosphate, trinaphthyl phosphate, bisphenol A bisphosphate, hydroquinone bisphosphate, resorcinol bisphosphate, resorcinol-diphenyl phosphate, trihydroxybenzene triphsophate, and cresyldiphenyl phosphate, their substituted derivatives, and their oligomers and polymers. One or more these phosphate compounds may be in the resin composition either singly or as combined.

For the non-halogen phosphorus compound, preferred is red phosphorus. Red phosphorus for use herein may be non-processed, but is preferably stabilized through surface treatment with, for example, any of thermoplastic resins or inorganic compounds. The thermoplastic resins include, for example, phenolic resins, phenol-formalin resins, urea resins, urea-formalin resins, melamine resins, melamine-formalin resins, alkyd resins, epoxy resins, and unsaturated polyester resins. The inorganic compounds include, for example, silica, bentonite, zeolite, kaolin, titanium oxide, zinc oxide, magnesium oxide, magnesium carbonate, barium sulfate, calcium phosphate, aluminium hydroxide, magnesium hydroxide, zinc hydroxide, and titanium hydroxide.

The silicone compounds are preferably functional group-having silicone compounds, such as functional group-having (poly)organosiloxanes. For their skeletons, they may be polymers or copolymers having a basic structure of a formula, $R^1_a R^2_b SiO_{(4-a-b)/2}$ wherein $R^1$ indicates a functional group-containing group; $R^2$ indicates a hydrocarbon group having from 1 to 12 carbon atoms; $0 < a \leq 3$, $0 \leq b < 3$, and $0 < a + b \leq 3$. The functional group includes, for example, an alkoxy group, an aryloxy group, a polyoxyalkylene group, a hydrogen group, a hydroxyl group, a carboxyl group, a cyanol group, an amino group, a mercapto group, and an epoxy group. One silicone compound may have a plurality of functional groups. A plurality of silicone compounds each having a different functional group may be combined for use herein. In the functional group-having silicone compounds, the ratio of the functional group ($R^1$) to the hydrocarbon group ($R^2$) preferably falls between 0.1 and 3 or so, more preferably between 0.3 and 2 or so.

The silicone compounds are liquid or powdery, and preferred for use herein are those well dispersible with the resin component when kneaded in melt with it. Of the liquid silicone compounds, preferred are those having a viscosity at room temperature of from 10 to 500,000 centistokes or so.

Even though liquid, the functional group-having silicone compounds uniformly disperse in the resin composition of the invention, and bleed little while the resin composition is molded and on the surface of the resin moldings.

(E) styrenic Resin:

For the styrenic resin for the component (E), usable are homopolymers of monovinylic aromatic monomers such as styrene and α-methylstyrene; rubber-modified styrenic resins obtained through polymerization of such monovinylic aromatic monomers in the presence of a rubber-like polymer; copolymers of monovinylic aromatic monomers and vinyl cyanide monomers such as acrylonitrile and methacrylonitrile; copolymers of the monomers with other vinylic comonomers copolymerizable with them, such as maleimide and methyl (meth)acrylate; and mixtures of these styrenic resins.

Of the styrenic resins, especially preferred are rubber-modified styrenic resins. The rubber-modified styrenic resins include, for example, high-impact styrenic resins produced through graft-polymerization of rubber-like polymers with styrenic monomers, such as high-impact polystyrenes (HIPS) produced through polymerization of rubber such as polybutadiene with styrene; ABS resins produced through polymerization of polybutadiene with acrylonitrile and styrene; MBS resins produced through polymerization of polybutadiene with methyl methacrylate and styrene.

In the rubber-modified styrenic resins, the amount of the rubber-like polymer may fall generally between 2 and 50% by weight, but preferably between 5 and 30% by weight, more preferably between 5 and 15% by weight. If the rubber-like polymer content is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of the rubber-like polymer include polybutadiene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, ethylene-propylene rubber, and ethylene-propylene-diene rubber.

Of the rubber-modified styrenic resins, more preferred are those modified with polybutadiene. The polybutadiene for them may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds).

Preferably, the styrenic resin for the component (E) has a melt index (MI), measured at a temperature of 200° C. under a load of 49N according to JIS K7210, falls between 1 and 30 g/10 min, more preferably between 2 and 20 g/10 min.

(F) Polyfluoro-olefin Resin:

The polyfluoro-olefin resin for the component (F) in the polycarbonate resin composition of the invention may be a polymer or copolymer having a fluoro-ethylenic structure. Concretely, it includes difluoroethylene polymers, tetrafluoroethylene polymers, tetrafluoroethylene-hexafluoropropylene copolymers, and copolymers of tetrafluoroethylene with fluorine-free ethylenic monomers. of those, most preferred is polytetrafluoroethylene (PTFE) desirably having a mean molecular weight of at least 500,000, more desirably from 500,000 to 10,000,000.

Of the polytetrafluoroethylene, more preferred is one having the ability to form fibrils, as its property of preventing the melts of the polycarbonate resin composition from dropping is better.

The blend ratio of the components (A) and (B) in the polycarbonate resin composition of the invention is such that the polycarbonate resin (A) accounts for from 50 to 99.9% by weight and the inorganic filler (B) accounts for from 0.1 to 50% by weight. Preferably, the polycarbonate resin (A) accounts for from 80 to 95% by weight, and the inorganic filler (B) accounts for from 5 to 20% by weight.

If the blend ratio of the polycarbonate resin (A) therein is smaller than 50% by weight, the resin composition could hardly retain the heat resistance and the mechanical strength intrinsic to the polycarbonate resin. If the blend ratio of the inorganic filler (B) is smaller than 0.1% by weight, the toughness and the light diffusibility of the resin moldings will be poor; but if larger than 50% by weight, the moldability of the resin composition will be poor.

The blend ratio of the arylphosphine (C) falls between 0.01 and 1 part by weight, preferably between 0.01 and 0.3 parts by weight, relative to 100 parts by weight of the resin composition comprising from 50 to 99.9% by weight of the polycarbonate resin (A) and from 0.1 to 50% by weight of the inorganic filler (B). If the blend ratio of the component (C) is smaller than 0.01 parts by weight, the durability in high-humidity atmospheres of the resin moldings containing the inorganic filler such as talc will lower; but even if larger than 1 part by weight, the durability in high-humidity atmospheres of the resin moldings could not be augmented any more.

The blend ratio of the flame retardant (D) falls between 0.1 and 20 parts by weight, relative to 100 parts by weight of the resin composition comprising from 50 to 99.9% by weight of the polycarbonate resin (A) and from 0.1 to 50% by weight of the inorganic filler (B). As so mentioned hereinabove, various types of flame retardants are usable for the component (D). In case where a phosphate is used, its blend ratio preferably falls between 5 and 10 parts by weight relative to 100 parts by weight of the resin composition of (A) and (B). In case where red phosphorus is used, its blend ratio preferably falls between 0.5 and 2 parts by weight relative to 100 parts by weight of the resin composition. In case where a silicone compound is used, its blend ratio preferably falls between 0.5 and 10 parts by weight relative to 100 parts by weight of the resin composition. This is because, if the blend ratio of the flame retardant is lower than the lowermost limit of the range, the flame retardancy of the resin composition will be poor; but if over the range, the mechanical strength including the impact resistance and the heat resistance of the resin moldings will lower.

One embodiment of the polycarbonate resin composition of the invention comprises from 50 to 99.9% by weight of the polycarbonate resin (A) and from 0.1 to 50% by weight of the inorganic filler (B), and contains from 0.01 to 1 part by weight, relative to 100 parts by weight of the total of (A) and (B), of the arylphosphine (C) of formula [1] and from 0.1 to 20 parts by weight, relative to the same, of the flame retardant (D). The polycarbonate resin composition comprising these components (A), (B), (C) and (D) is a good molding material capable of being molded into moldings having high mechanical strength and good heat resistance and having good flame retardancy. Another advantage of the resin composition is that, when it is molded in a mode of injection molding, it is free from the problem of flame retardant adhesion to molds which is often seen when conventional, flame retardant-containing resin compositions especially those containing a phosphate-type flame retardant are injection-molded.

The blend ratio of the styrenic resin (E) in the polycarbonate resin composition of the invention falls between 1 and 40 parts by weight, preferably between 10 and 20 parts by weight, relative to 100 parts by weight of the resin composition comprising from 50 to 99.9% by weight of the polycarbonate resin (A) and from 0.1 to 50% by weight of the inorganic filler (B). Containing the styrenic resin (E), the melt fluidity and the chemical resistance of the resin composition and its moldings are improved. If, however, its blend ratio is smaller than 1 part by weight, the styrenic resin (E) will be ineffective for improving the melt fluidity and the chemical resistance of the resin composition. If, on the other hand, the blend ratio of the styrenic resin (E) is larger than 40 parts by weight, the proportion of the essential ingredient, polycarbonate resin in the resin composition shall be relatively low, and the mechanical strength and the heat resistance of the resin moldings will be thereby lowered.

Another embodiment of the polycarbonate resin composition of the invention comprises from 50 to 99.9% by weight of the polycarbonate resin (A) and from 0.1 to 50% by weight of the inorganic filler (B), and contains from 0.01 to 1 part by weight, relative to 100 parts by weight of the total of (A) and (B), of the arylphosphine (C) of formula [1], from 0.1 to 20 parts by weight, relative to the same, of the flame retardant (D), and from 1 to 40 parts by weight, relative to the same, of the styrenic resin (E). This is a flame-retardant polycarbonate resin composition having good melt fluidity.

The blend ratio of the polyfluoro-olefin resin (F) in the polycarbonate resin composition of the invention falls between 0.01 and 5 parts by weight, preferably between 0.1 and 0.5 parts by weight, relative to 100 parts by weight of the resin composition comprising from 50 to 99.9% by weight of the polycarbonate resin (A) and from 0.1 to 50% by weight of the inorganic filler (B). If its blend ratio is smaller than 0.01 parts by weight, the polyfluoro-olefin resin (F) will be ineffective for further improving the flame retardancy of the resin composition; but even if larger than 5 parts by weight, its effect could not be augmented any more.

Still another embodiment of the polycarbonate resin composition of the invention comprises from 50 to 99.9% by weight of the polycarbonate resin (A) and from 0.1 to 50% by weight of the inorganic filler (B), and contains from 0.01 to 1 part by weight, relative to 100 parts by weight of the total of (A) and (B), of the arylphosphine (C) of formula [1], from 0.1 to 20 parts by weight, relative to the same, of the flame retardant (D), from 1 to 40 parts by weight, relative to the same, of the styrenic resin (E), and from 0.01 to 5 parts by weight, relative to the same, of the polyfluoro-olefin resin (F). This is a flame-retardant polycarbonate resin composition having the advantage of well-balanced physical properties.

The polycarbonate resin composition of the invention may further contain, in addition to the above-mentioned components, some desired amount of additives that are generally added to ordinary thermoplastic resins and their compositions. The additives include, for example, antioxidants, antistatic agents, UV absorbents, light stabilizers (weathering agents), plasticizers, microbicides, compatibilizers, and colorants (dyes, pigments).

A method for producing the flame-retardant polycarbonate resin composition of the invention is described. The composition may be produced by mixing and kneading the components (A) to (F) and optional additives in a ratio desired for the properties of the moldings of the composition. Formulating and mixing the constituent components into the intended resin composition may be effected in any known manner, using any known mixer or kneader. For example, the constituent components are pre-mixed in an ordinary device, such as a ribbon blender or a drum tumbler, and then further kneaded in a Henschel mixer, a Banbury mixer, a single-screw extruder, a double-screw extruder, a multi-screw extruder, or a cokneader. The temperature at which the components are mixed and kneaded generally falls between 240 and 300° C. For melt-kneading and molding the resin composition, preferably used is an extrusion molding machine, and more preferred is a vented extrusion molding machine. Other components than the polycarbonate resin may be previously mixed with polycarbonate resin or with any other thermoplastic resin to prepare a master batch, and it may be added to the other constituent components.

Having been prepared in the manner noted above, the flame-retardant polycarbonate resin composition of the invention may be molded into various moldings in the melt-molding devices as above, or, after it is pelletized, the resulting pellets may be molded into various moldings through injection molding, injection compression molding, extrusion molding, blow molding, pressing, or foaming. Especially preferably, the composition is pelletized in the melt-kneading manner as above, and the resulting pellets are molded into moldings through injection molding or injection compression molding. For injection molding of the composition, employable is a gas-assisted injection molding method so as to prevent shrinkage cavity around the moldings and to reduce the weight of the moldings. The moldings produced in the method are lightweight and have good appearance.

The moldings of the polycarbonate resin composition of the invention are usable for various housings and parts of electric and electronic appliances, such as duplicators, facsimiles, televisions, radios, tape recorders, video decks, personal computers, printers, telephones, information terminals, refrigerators, and microwave ovens. Except for such electric and electronic appliances, the moldings have still other applications, for example, for automobile parts.

The invention is described more concretely with reference to the following Examples and Comparative Examples.

[EXAMPLES 1 TO 4, AND COMPARATIVE EXAMPLES 1 TO 6]

[1] Production of Polycarbonate Resin Compositions:

The components shown in Table 1 were blended in the ratio indicated therein (all by weight), fed into a vented double-screw extruder (TEM35 from Toshiba Kikai), melted and kneaded therein at 260° C., and then pelletized. Prior to melting and kneading the components, 0.2 parts by weight of Irganox 1076 (from Ciba Specialty Chemicals) and 0.1 parts by weight of Adekastab C (from Asahi Denka Industry) both serving as an antioxidant were added to all the starting materials in Examples and Comparative Examples.

The resulting pellets were dried at 120° C. for 12 hours, and then molded into test pieces in a mode of injection molding at 270° C. The mold temperature was 80° C.

The molding materials used herein are mentioned below.
Component (A):
PC-1 in Table 1 is a polycarbonate resin, Toughlon A1900 (from Idemitsu Petrochemical), for which the starting material is bisphenol A. The resin has a melt index, measured at a temperature of 300° C. under a load of 11.76 N, of 20 g/10 min, and has a viscosity-average molecular weight of 19,000. PC-2 in Table 1 is a polycarbonate-polydimethylsiloxane copolymer resin comprising polycarbonate block units (for these, the starting material is bisphenol A), and containing 4% by weight of polydimethylsiloxane block units (30 units in total). The copolymer resin has a viscosity-average molecular weight of 20,000.

Component (B):
Talc is TP-A25 (from Fuji Talc), having a mean particle size of 1.2 μm. Glass fibers are chopped fibers of MA409C (from Asahi Fiber Glass), having a fiber diameter of 13 μm and a length of 3 mm.
Component (C):
TPP in Table 1 is an arylphosphine, triphenylphosphine from Hokko Chemical.
Component (D):
Flame retardant-1 in Table 1 is a flame retardant, PFR (from Asahi Denka Kogyo). This is resorcinol bis(diphenyl phosphate). Flame retardant-2 is CR741 (from Daihachi Chemical Kogyo). This is bisphenol bis(diphenyl phosphate). Flame retardant-3 is KR219 (from Shin-etsu Chemical). This is methylphenylsilicone having vinyl and methoxy groups.
Component (E):
HIPS in Table 1 is a rubber-modified styrenic resin, high-impact polystyrene IT44 (from Idemitsu Petrochemical), having a rubber content of 7% by weight, and a melt index, measured at a temperature of 200° C. under a load of 49 N, of 8 g/10 min. ABS is an ABS resin, acrylonitrile-butadiene-styrene copolymer DP611 (from Technopolymer), having a melt index, measured at a temperature of 200° C. under a load of 49 N, of 2 g/10 min.
Component (F):
PTFE in Table 1 is a polyfluoro-olefin resin, polytetrafluoroethylene CD076 (from Asahi Glass).

[2] Evaluation of Polycarbonate Resin Compositions:
Test pieces of the polycarbonate resin compositions obtained in the above [1] were tested for their properties, according to the test methods mentioned below.
(1) Izod Impact Strength:
Measured according to ASTM D-256. The temperature is 23° C., and the thickness of samples is ⅛ inches.
(2) Flexural Modulus:
Measured according to ASTM D-790. The temperature is 23° C., and the thickness of samples is 4 mm.
(3) In-Line Thermal Stability (at 300° C. for 20 Minutes) Based on ΔE:
An injection-molding machine (Toshiba Kikai's 100EN Model) is used. The cylinder temperature is kept just at 300° C. A resin composition to be tested is molded into square plates having an outer size of 80 mm×80 mm and a thickness of 3.2 mm. First, the sample is molded in an ordinary manner for 10 shots. Then, the sample is metered, fed into the machine and kept therein for 20 minutes. After having been thus kept in the machine, this is molded, and the color of the first to third shot moldings is measured. The data are averaged, and the average color is referred to as the color of the sample kept heated at 300° C. for 20 minutes in the machine. This is compared with the color of the fresh sample not kept heated in the machine, and the color difference is referred to as ΔE. For measuring the color of the test pieces, used is Machbeth's Color-Eye.
(4) In-Line Thermal Stability Based on ΔMv of PC:
The injection-molding machine (Toshiba Kikai's 100EN Model) is used. The cylinder temperature is kept just at 300° C. A resin composition to be tested is molded into square plates having an outer size of 80 mm×80 mm and a thickness of 3.2 mm. First, the sample is molded in an ordinary manner for 10 shots. Then, the sample is metered, fed into the machine and kept therein for 20 minutes. After having been thus kept in the machine, this is molded, and the viscosity-average molecular weight (Mv) of the first to third shot resin melts is measured. The data are averaged. The averaged value is compared with the viscosity-average molecular weight of the fresh sample not kept heated at 300° C. for 20 minutes in the machine; and the difference between the two is referred to as ΔMv.

(5) Adhesion of Molding Material to Mold:

The injection-molding machine (Toshiba Kikai's 100EN Model) is used, and this is equipped with a mold for square plates having an outer size of 80 mm×80 mm and a thickness of 3.2 mm. The cylinder temperature is kept just at 300° C. The amount of the resin composition to be fed into the mold is so controlled that it gives a molding having a size of 40 mm×80 mm. This means that the resin composition to the mold is metered for short-shot molding. After 120 shots, the mold is macroscopically checked for the adhesion of the flame retardant thereto.

(6) Thermal Aging Resistance:

Test pieces are molded, and kept in an oven at 80° C. for 10 days. Having been thus aged under heat, these are tested.

<1>Izod Impact Strength:

The aged test pieces are measured according to ASTMD-256, at 23° C. Their thickness is ⅛ inches.

<2>Color Change:

The color of the aged test pieces is measured with Machbeth's Color-Eye, and compared with that of the non-aged fresh pieces.

(7) Moisture Resistance:

Test pieces are molded, and kept in a thermo-hygrostat at a temperature of 60° C. and a humidity of 95%, for 1000 hours. Having thus absorbed moisture, these are tested.

<1>Izod Impact Strength:

The aged test pieces are measured according to ASTMD-256, at 23° C. Their thickness is ⅛ inches.

<2>Color Change:

The color of the aged test pieces is measured with Machbeth's Color-Eye, and compared with that of the non-aged fresh pieces.

(8) Recyclability:

Using the injection-molding machine, Toshiba Kikai's 100EN Model, the resin composition obtained in the above [1] is molded, and the moldings are ground in a grinder. The thus-ground powder is again molded in the same manner as previously. The cycle of molding and grinding is repeated 5 times, and the moldings obtained in the 6th molding cycle are tested for the recyclability of the sample.

<1>Izod Impact Strength:

The recycled moldings are measured according to ASTM D-256, at 23° C. Their thickness is ⅛ inches.

<2>Color Change:

The color of the recycled moldings is measured with Machbeth's Color-Eye, and compared with that of the fresh moldings.

(9) Flame Retardancy:

Using the injection-molding machine, Toshiba Kikai's 100EN Model, the resin composition obtained in the above [1] is molded into bars having an outer size of 127 mm×12.7 mm and a thickness of 1.5 mm. The bars are tested for their flame retardancy, according to the combustion test of UL94 V-0.

The test results are given in Tables 1-1 to 1-3.

TABLE 1-1

| | Example, Comparative Example | Example 1 | Comp. Ex. 1 | Comp. Ex. 2 |
|---|---|---|---|---|
| Blend Ratio | (A) PC-1 | 90 | 90 | 90 |
| | PC-2 | — | — | — |
| | (B) Talc | 10 | 10 | 10 |
| | Glass Fibers | — | — | — |
| | (C) TPP | 0.1 | — | — |
| | Phosphoric Acid | — | — | 0.1 |
| Test Results | Izod Impact Strength (kJ/m²) | 15 | 5 | 12 |
| | Flexural Modulus (MPa) | 3400 | 3500 | 3400 |
| | In-line Thermal Stability (at 300° C. for 20 minutes), ΔE | 3 | 20 | 8 |
| | In-line Thermal Stability, ΔMv of PC | 3500 | 8000 | 6000 |
| | Thermal Aging Resistance, Izod Impact Strength (kJ/m²) | 13 | 2 | 5 |
| | Thermal Aging Resistance, Color Change ΔE | 3 | 9 | 6 |
| | Moisture Resistance, Izod Impact Strength (kJ/m²) | 10 | 1 | 2 |
| | Moisture Resistance, Color Change ΔE | 5 | 12 | 15 |
| | Recyclability, Izod Impact Strength (kJ/m²) | 15 | 3 | 12 |
| | Recyclability, Color Change ΔE | 2 | 5 | 3 |
| | Flame Retardancy (1.5 mm, UL94) | V-2 | V-2 | V-2 |

TABLE 1-2

| | Example, Comparative Example | Example 2 | Comp. Ex. 3 | Comp. Ex. 4 |
|---|---|---|---|---|
| Blend Ratio | (A) PC-1 | 90 | 90 | 90 |
| | PC-2 | — | — | — |
| | (B) Talc | 10 | 10 | 10 |
| | Glass Fibers | — | — | — |
| | (C) TPP | 0.2 | — | — |
| | Phosphoric Acid | — | — | 0.2 |
| | (D) Flame Retardant-1 | 10 | 10 | 10 |
| | Flame Retardant-2 | — | — | — |
| | Flame Retardant-3 | — | — | — |
| | (E) HIPS | 20 | 20 | 20 |
| | ABS | — | — | — |
| | (F) PTFE | 0.3 | 0.3 | 0.3 |

TABLE 1-2-continued

| Example, Comparative Example | | Example 2 | Comp. Ex. 3 | Comp. Ex. 4 |
|---|---|---|---|---|
| Test Results | Izod Impact Strength (kJ/m$^2$) | 30 | 20 | 25 |
| | Flexural Modulus (MPa) | 3600 | 3600 | 3600 |
| | In-line Thermal Stability (at 300° C. for 20 minutes), ΔE | 2 | 5 | 3 |
| | In-line Thermal Stability, ΔMv of PC | 2000 | 3500 | 2500 |
| | Adhesion to Mold (at 280° C.) | no | yes | yes |
| | Thermal Aging Resistance, Izod Impact Strength (kJ/m$^2$) | 25 | 10 | 15 |
| | Thermal Aging Resistance, Color Change ΔE | 3 | 8 | 8 |
| | Moisture Resistance, Izod Impact Strength (kJ/m$^2$) | 25 | 5 | 5 |
| | Moisture Resistance, Color Change ΔE | 5 | 10 | 15 |
| | Recyclability, Izod Impact Strength (kJ/m$^2$) | 30 | 10 | 25 |
| | Recyclability, Color Change ΔE | 2 | 4 | 3 |
| | Flame Retardancy (1.5 mm, UL94) | V-0 | V-1 | V-1 |

TABLE 1-3

| Example, Comparative Example | | | Example 3 | Comp. Ex. 5 | Example 4 | Comp. Ex. 6 |
|---|---|---|---|---|---|---|
| Blend Ratio | (A) | PC-1 | 80 | 80 | 65 | 65 |
| | | PC-2 | — | — | 30 | 30 |
| | (B) | Talc | — | — | 5 | 5 |
| | | Glass Fibers | 10 | 10 | — | — |
| | (C) | TPP | 0.1 | — | 0.2 | — |
| | | Phosphoric Acid | — | 0.1 | — | — |
| | (D) | Flame Retardant-1 | — | — | — | — |
| | | Flame Retardant-2 | 10 | 10 | — | — |
| | | Flame Retardant-3 | — | — | 2 | 2 |
| | (E) | HIPS | — | — | — | — |
| | | ABS | 20 | 20 | 10 | 10 |
| | (F) | PTFE | 0.3 | 0.3 | 0.3 | 0.3 |
| Test Results | Izod Impact Strength (kJ/m$^2$) | | 12 | 12 | 50 | 35 |
| | Flexural Modulus (MPa) | | 4100 | 4100 | 2900 | 3000 |
| | In-line Thermal Stability (at 300° C. for 20 minutes), ΔE | | 2 | 2 | 2 | 4 |
| | In-line Thermal Stability, ΔMv of PC | | 1000 | 1500 | 1000 | 3000 |
| | Adhesion to Mold (at 280° C.) | | no | yes | — | — |
| | Thermal Aging Resistance, Izod Impact Strength (kJ/m$^2$) | | 11 | 8 | 45 | 20 |
| | Thermal Aging Resistance, Color Change ΔE | | 3 | 6 | 2 | 4 |
| | Moisture Resistance, Izod Impact Strength (kJ/m$^2$) | | 10 | 4 | 40 | 15 |
| | Moisture Resistance, Color Change ΔE | | 4 | 8 | 4 | 6 |
| | Recyclability, Izod Impact Strength (kJ/m$^2$) | | 11 | 11 | 50 | 25 |
| | Recyclability, Color Change ΔE | | 2 | 2 | 2 | 4 |
| | Flame Retardancy (1.5 mm, UL94) | | V-0 | V-1 | V-0 | V-2 out |

In Table 1 above, the data of Example 1 are compared with those of Comparative Example 1. It is understood that the polycarbonate resin containing talc only is much deteriorated, concretely, the impact strength of the resin moldings is lowered and the color change thereof is great in the moisture resistance test. This means that triphenylphosphine added to the composition of polycarbonate resin and talc is effective for preventing the resin from being deteriorated. The data of Example 1 are compared with those of Comparative Example 1. It is understood that the known composition comprising polycarbonate resin, talc and phosphoric acid (described in Japanese Patent Laid-Open No. 283760/1990) is not deteriorated so much, but the impact strength of its moldings is lowered and the color change thereof is great in the thermal aging resistance test and the moisture resistance test.

The data of Example 2 are compared with those of Comparative Examples 3 and 4. It is understood that adding triphenylphosphine to the composition comprising polycarbonate resin and styrenic resin and containing a flame retardant resulted in further improving the flame retardancy of the resin composition. In addition, the thermal aging resistance and the moisture resistance of the resin composition are improved with no adhesion of the flame retardant to molds.

The data of Example 3 are compared with those of Comparative Example 5. It is understood that, when glass fibers are used for the inorganic filler in place of talc, the same results are obtained. The data of Example 4 are compared with those of Comparative Example 6. It is understood that, when a silicone-type flame retardant is used in place of the phosphate-type flame retardant, the same results are obtained.

INDUSTRIAL APPLICABILITY

The present invention provides a polycarbonate resin composition having good durability even in high-moisture atmospheres, and provides a flame-retardant polycarbonate resin composition having good flame retardancy. While molded, the resin composition adheres little to molds.

What is claimed is:

1. A polycarbonate resin composition comprising (A) from 50 to 99.9% by weight of a polycarbonate resin and (B)

from 0.1 to 50% by weight of an inorganic filler selected from the group consisting of talc, mica, kaolin, diatomaceous earth, calcium carbonate, calcium sulfate, barium sulfate, glass fibers, carbon fibers, and potassium titanate, and containing (C) from 0.01 to 1 part by weight, relative to 100 parts by weight of the total of (A) and (B), of an arylphosphine of formula (1):

P—(X)$_3$     (1)

wherein X represents a hydrocarbon group, and at least one X is an optionally-substituted aryl group having from 6 to 18 carbon atoms.

2. The polycarbonate resin composition as claimed in claim 1, wherein the inorganic filler (B) is talc or mica.

3. The polycarbonate resin composition as claimed in claim 2, wherein the inorganic filler (B) is talc having a mean particle size of from 0.2 to 20 μm.

4. The polycarbonate resin composition as claimed in claim 1, wherein the arylphosphine (C) is triphenylphosphine.

5. The polycarbonate resin composition as claimed in claim 1, which further contains (D) from 0.1 to 20 parts by weight, relative to 100 parts by weight of the total of the polycarbonate resin (A) and the inorganic filler (B), of a flame retardant.

6. The polycarbonate resin composition as claimed in claim 5, wherein the flame retardant (D) is one or more selected from the group consisting of phosphates, red phosphorus, and silicone compounds.

7. The polycarbonate resin composition as claimed in claim 5, which further contains (F) from 0.01 to 5 parts by weight, relative to 100 parts by weight of the total of the polycarbonate resin (A) and the inorganic filler (B), of a polyfluoro-olefin resin.

8. The polycarbonate resin composition as claimed in claim 7, wherein the polyfluoro-olefin resin (F) is a polytetrafluoroethylene having the ability to form fibrils and having a mean molecular weight of at least 500,000.

9. Housings or parts of electric and electronic appliances, made by molding the polycarbonate resin composition of claim 1.

* * * * *